United States Patent
Laborie et al.

(10) Patent No.: US 9,349,094 B2
(45) Date of Patent: *May 24, 2016

(54) OPTIMAL NON-RECURSIVE METHOD FOR FINDING A MINIMAL SUBSET SATISFYING AN UPWARD-CLOSED PROPERTY

(71) Applicant: International Business Machines Corporation, Armonk, NY (US)

(72) Inventors: Philippe Laborie, L'Hay-les-Roses (FR); Paul Shaw, Grasse (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,505

(22) Filed: Jun. 4, 2014

(65) Prior Publication Data

US 2015/0106319 A1   Apr. 16, 2015

Related U.S. Application Data

(63) Continuation of application No. 14/055,017, filed on Oct. 16, 2013.

(51) Int. Cl.
    *G06N 5/02*     (2006.01)
    *G06N 5/00*     (2006.01)
    *G06F 17/10*    (2006.01)

(52) U.S. Cl.
    CPC ............... *G06N 5/006* (2013.01); *G06F 17/10* (2013.01)

(58) Field of Classification Search
    None
    See application file for complete search history.

(56) References Cited

U.S. PATENT DOCUMENTS

| 6,086,617 A * | 7/2000 | Waldon | G05B 17/02 703/2 |
| 7,565,516 B2 * | 7/2009 | Croxford | G06F 13/4013 707/999.005 |
| 2012/0253754 A1 * | 10/2012 | Goswami | G06F 17/11 703/2 |

OTHER PUBLICATIONS

Joao Marques-Silva, Mikoláš Janota, Anton Belov, Minimal sets over monotone predicates in boolean formulae. CAV 2013, LNCS 8044, pp. 592-607 2013. Proceedings of the 25th international conference on Computer Aided Verification, Saint Petersburg, Russia, Jul. 13-19, 2013.*

List of IBM Patents or Patent Applications Treated as Related for U.S. Appl. No. 14/055,017, filed Oct. 16, 2013, 1 page.

* cited by examiner

*Primary Examiner* — Kakali Chaki
*Assistant Examiner* — Michael Zidanic
(74) *Attorney, Agent, or Firm* — Cantor Colburn LLP; Kevin Fournier (57) ABSTRACT

According to an aspect, a method for providing a minimal explanation to a set of unsatisfiable constraints involves retrieving a minimal subset of constraints that remain together unsatisfiable. The method includes iterating over a list of n constraints, and building a minimal explanation to a set of unsatisfiable constraints by determining which constraint to add to the set of unsatisfiable constraints. Building includes accelerating by removing an increasing number of constraints until removed further constraints makes the set of constraints satisfiable. A dichotomic search is performed on the removed further constraints. The average observed distance is identified between successive constraints in the set of unsatisfiable constraints. A plurality of $2^k$ further constraints located in the list of constraints is removed at the average observed distance from the most recently added constraint. Testing whether a current selected subset is unsatisfiable is performed for the first $\log_2(n)$ added constraints.

5 Claims, 6 Drawing Sheets

OPTIMAL NON-RECURSIVE METHOD FOR FINDING A MINIMAL SUBSET SATISFYING AN UPWARD-CLOSED PROPERTY

CROSS-REFERENCE TO RELATED APPLICATION

This application is a continuation of U.S. patent application Ser. No. 14/055,017 filed Oct. 16, 2013, the content of which is incorporated by reference herein in its entirety.

FIELD OF THE INVENTION

The present invention relates to the field of finding a minimal subset satisfying an upward-closed property, and more particularly to the finding of such a minimal subset using a method that is non-recursive and is optimal for both small explanations and large explanations.

BACKGROUND

Given a finite set U, finding a minimal subset X* of the finite set U satisfying a given property P is a frequent problem in computer science. For instance, this problem can be found in diagnosis (e.g., find a minimal subset of faulty components of a system that explains the current observations) or in non-monotonic logics (e.g., find a minimal subset of abnormalities in the clauses that restore admissibility).

In several important applications the property P is upward-closed, that is, whenever it holds for a subset X it also holds for any superset of X. This is typically the case in the identification of minimal infeasible subsets (conflicts) of constraints C in optimization models. If a subset X of constraints is infeasible then any superset of X clearly is infeasible too. This is described in more detail in John W. Chinneck, "Finding a useful subset of constraints for analysis in an infeasible linear program", INFORMS Journal on Computing, 9:164-174, 1997.

In a first simple example, a constraint is an object that describes a relation between several objects that must be enforced. For instance: "the salary of a person must be above $10 per hour". A constraint is said to be satisfied for a given instance if it is true for the case considered: "Peter's salary is $15 per hour"—where Peter is the instance considered. In other cases, a constraint may be unsatisfied for a given instance: "John's salary is $8 per hour".

Complex optimization problems are assemblies of thousands or hundreds of thousands of such constraints, most often much more complex ones, coupled to instances that are to meet the constraints.

For instance, consider the very simple set of statements (constraints and instances) assuming there are 3 persons in a company (John, Peter and Mary):

A—the total budget per hour has to be between $25 and $30
B—the salary of a manager must be strictly above that of his or her employees and John is Peter's manager
C—John's salary is $10
D—Mary's salary is $20
E—the salary of a person must be at or above $10 per hour These statements boil down to the following constraints:
A1: 25≤salary[John]+salary[Peter]+salary[Mary]
A2: salary[John]+salary[Peter]+salary[Mary]≤30
B1: salary[John]>salary[Peter]
C1: salary[John]=10
D1: salary[Mary]=20
E1: salary[John]≥10
E2: salary[Peter]≥10
E3: salary[Mary]≥10

The question asked is "find a salary for John, Peter and Mary that meets all the above constraints". It is desirable to rapidly answer such kinds of questions which in practice are much more complex with many more variables. In the above example, the problem cannot be solved and therefore the set of constraints is infeasible. Two possible example explanations for infeasibility of the problem are:

1. The total budget for the 3 employees cannot exceed $30 (A2), but the salary of John is $10 (C1), the one of Mary $20 (D1) and the one of Peter at least $10 (E2) thus the total budget will be at least $40; and
2. John's salary cannot be more than $10 (C1). As Peter's salary is at least $10 (E2), this is not consistent with constraint B1 stating that because John is Peter's manager his salary should be above that of Peter's salary.

Both explanations 1 and 2 above are minimal in the sense that removing any constraint from the explanation leads to a feasible sub-problem. For instance explanation 2 consists of constraints (B1, C1, E2). If one removes constraint B1, the system (C1, E2) is feasible (for instance with salary [John]=10, salary[Peter]=10). If one removes constraint C1, the system (B1, E2) is feasible (for instance with salary [John]=15, salary[Peter]=10). If one removes constraint E2, the system (B1, C1) is feasible (for instance with salary [John]=10, salary[Peter]=9).

Figure 1:
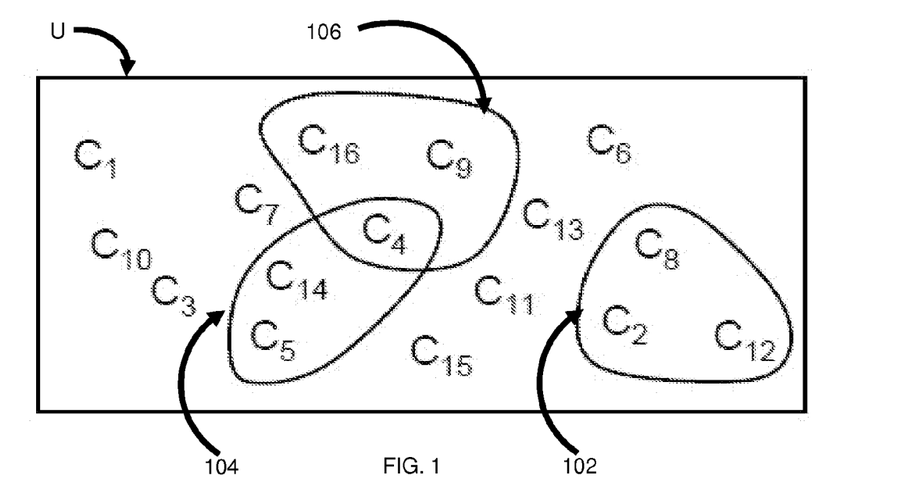
FIG. 1 shows a finite set U and minimal explanations for infeasibility of an optimization model.

FIG. 1 shows a finite set U of 16 constraints $C_i$. Constraints $C_i$ can be, for example x<y. It is desired to compute a minimal explanation of constraints to show infeasibility of an optimization model. In the example of FIG. 1, constraint $C_2$ of x<y, constraint $C_8$ of y<z and constraint $C_{12}$ of z<x forms a minimal explanation 102 since all three constraints cannot be satisfied. Other minimal explanations are constraints $C_4$, $C_5$ and $C_{14}$ (104) and constraints $C_4$, $C_9$ and $C_{16}$ (106).

Figure 2:
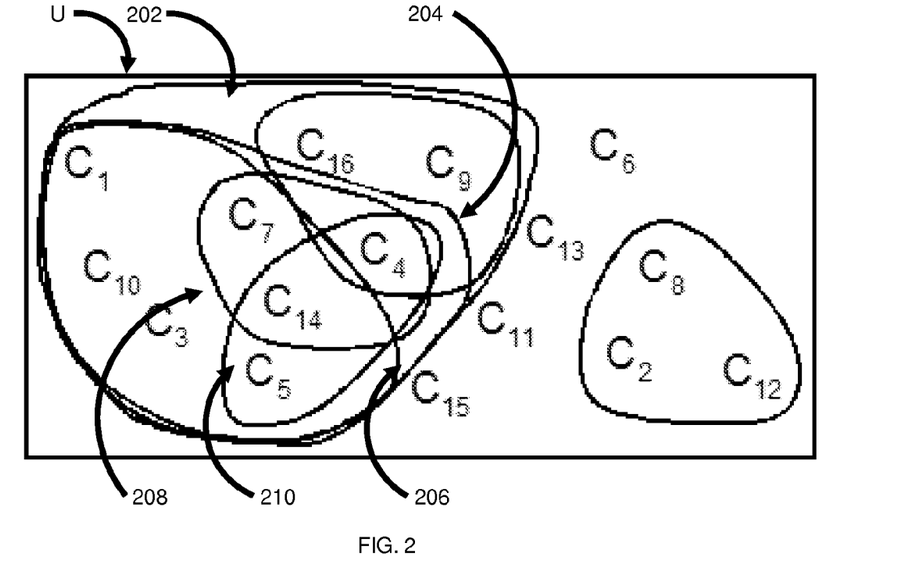
FIG. 2 shows the finite set U of FIG. 1 and iterative attempts to find a minimal explanation for infeasibility of an optimization model.

Typically, methods of finding a minimal subset work by iteratively checking some subsets of constraints for infeasibility. FIG. 2 shows the subsets which may be checked by a typical method. In a first check a subset 202 comprising $C_1$, $C_3$, $C_4$, $C_5$, $C_7$, $C_9$, $C_{10}$, $C_{14}$ and $C_{16}$ is checked. This subset is found to be infeasible. However, further checks are done to see if this is a minimal infeasible subset. In a second check, constraints $C_9$ and $C_{16}$ are deleted from the subset, and a subset 204 comprising $C_1$, $C_3$, $C_4$, $C_5$, $C_7$, $C_{10}$ and $C_{14}$ is checked. This subset is also found to be infeasible. In a third check, constraint $C_4$ is deleted from the subset, and a subset 206 comprising $C_1$, $C_3$, $C_5$, $C_7$, $C_{10}$ and $C_{14}$ is checked. This subset is found to be feasible and so is not a minimal infeasible subset. In a fourth check, constraint $C_4$ is replaced in the subset, constraints $C_1$, $C_3$, $C_5$, $C_{10}$ are deleted from the subset, and a subset 208 comprising $C_4$, $C_7$ and $C_{14}$ is checked. This subset is found to be feasible and so is also not a minimal infeasible subset. In a fifth check, constraint $C_5$ is replaced in the subset, constraint $C_7$ is deleted from the subset, and a subset 210 comprising $C_4$, $C_5$, and $C_{14}$ is checked. This subset is found to be infeasible and is a minimal subset. The performance of a method of finding a minimal subset is estimated by counting the number of checks before finding a minimal explanation.

In general, checking property P for a particular subset X is an expensive operation. It may be NP-complete. The abbreviation NP stands for "nondeterministic polynomial time". This means that the time required to solve the problem using any currently known algorithm increases very quickly as the size of the problem grows.

Frequently, approaches for solving this minimal subset problem rely on the particular features of the property P being considered. For instance in the optimization context mentioned above, John W. Chinneck, "Finding a useful subset of constraints for analysis in an infeasible linear program", INFORMS Journal on Computing, 9:164-174, 1997 discloses the use of elastic filters for Linear Programming models. Narendra Jussien and Olivier Lhomme, "Local search with constraint propagation and conflict-based heuristics", Artificial Intelligence, 139(1):21-45, July 2002 discloses explanations recording for Constraint Programming models. Joao P. Marques Silva and Karem A. Sakallah, "Conflict analysis in search algorithms for satisfiability", in Proceedings of the 8th International Conference on Tools with Artificial Intelligence (ICTAI'96), 1996, discloses no-goods learning for Boolean Satisfiability models.

But the logic behind checking property P for a particular subset X can be so complex that it may turn out to be necessary or advantageous to consider it as a black box operation. Property P(X) could for instance be the outcome of a complex simulation process based on a set of input events X. In the context of minimal conflicts identification, the advances in the optimization state-of-the-art result in increasingly sophisticated and efficient engines. Such engine's sophistication makes it harder to implement intrusive methods to compute minimal conflicts whereas increase of the engine's efficiency makes infeasibility property checking faster. Both aspects tend to make the black box approach more attractive.

It is desirable to find a minimal subset satisfying an upward-closed property without any knowledge of the property except for the assumption that it is upward-closed. The complexity measure typically considered is therefore the number of property checks performed. So far, two types of approaches have been used to solve this problem, recursive approaches and iterative approaches.

Ulrich Junker, "QuickXplain: Preferred explanations and relaxations for over-constrained problems", in Proc. AAAI-04, 2004 discloses a recursive approach implemented in the QuickXplain algorithm.

Fred Hemery, Christophe Lecoutre, Lakhdar Sais, and Frederic Boussemart, "Extracting MUCs from constraint networks", In Proc. 17th European Conference on Artificial Intelligence (ECAI'06), 2006 discloses an iterative approach called the dichotomic algorithm (DC).

The iterative method of an exemplary embodiment of the present invention is shown to outperform the above approaches in both extremal cases when the selected minimal subset is small and when it is large. An experimental study on randomly generated instances suggests that this method also outperforms existing methods in between those extremal cases.

U.S. Pat. No. 7,478,297 B2 discloses finding diagnosis for integrated logic circuit. U.S. Pat. No. 7,337,090 B1 is also about diagnosis but in a more general context than U.S. Pat. No. 7,478,297 B2. A part of the process depicted on the right part of FIG. 3A (blocks 317-318-313-320) could be considered as the problem of finding as a minimal subset satisfying an upward bounded property (just like the problem of finding a minimal infeasible subset). Indeed if S is a valid subset of symptoms (i.e., an infeasible subset), then any superset of this subset is also valid. The patent discloses checking all symptoms individually (block 317), which corresponds to a "naive" method.

U.S. Pat. No. 6,336,110 B1 discloses finding a solution to a constraint satisfaction problem.

I. Shah, "A Hybrid Algorithm for Finding Minimal Unsatisfiable Subsets in Over-constrained CSPs" International Journal of Intelligent Systems, Volume 26, Issue 11, November 2011, Pages 1023-1048 and Mark H Liffiton and Karem A Sakallah, "Algorithms for Computing Minimal Unsatisfiable Subsets of Constraints", Journal of Automated Reasoning, 40(1):1-33, January 2008 aims at computing several (and even all) Minimal Unsatisfiable Subsets (MUSes). In order to do so, the approaches strongly rely on the duality between Minimal Unsatisfiable Subsets and Minimal Correction Sets. It would be desirable to focus on the problem of computing ONE unsatisfiable subset. In the context of computing ONE unsatisfiable subset, the approaches presented in the above papers are not efficient because they initially require the computation of several or all Minimal Correction Sets, which is far too expensive if one is only interested in ONE unsatisfiable subset.

It would be desirable to have a method to find a minimal explanation for infeasibility of an optimization model that improves on the performance of existing methods and is shown to be optimal on both extreme cases (i.e., small explanations/large explanations).

BRIEF SUMMARY OF THE INVENTION

Embodiments provide a minimal explanation to a set of unsatisfiable constraints involving retrieving a minimal subset of constraints that remain together unsatisfiable. An aspect includes computer-implemented method involving retrieving by a processor of a computer, a minimal subset of constraints that remain together unsatisfiable. The computer-implemented method includes providing a list of constraints, the list including n constraints, iterating over the list of constraints from a first one of the list of constraints to an $n^{th}$ one of the list of constraints, and building a minimal explanation to a set of unsatisfiable constraints by determining by the processor which constraint to add to the set of unsatisfiable constraints. The building includes: based on determining that a single removed constraint from the list of constraints keeps the set of constraints unsatisfiable, then starting with k=1, repeating removal of a plurality of $2^k$ further constraints adjacent in the list of constraints to the removed constraint and incrementing k until the removed plurality of $2^k$ further constraints makes the set of constraints satisfiable.

Another aspect is a computer program product for providing a minimal explanation to a set of unsatisfiable constraints, the providing involving retrieving a minimal subset of constraints that remain together unsatisfiable. The computer program product includes a computer readable storage medium having computer readable program code executable by a computer processor to perform: providing a list of constraints, the list including n constraints, iterating over the list of constraints from a first one of the list of constraints to an $n^{th}$ one of the list of constraints, and building a minimal explanation to a set of unsatisfiable constraints by determining which constraint to add to the set of unsatisfiable constraints. The building includes: based on determining that a single removed constraint from the list of constraints keeps the set of constraints unsatisfiable, then starting with k=1, repeating removal of a plurality of $2^k$ further constraints adjacent in the list of constraints to the removed constraint and incrementing k until the removed plurality of $2^k$ further constraints makes the set of constraints satisfiable.

Yet another aspect includes a computer-implemented method for providing a minimal explanation to a set of unsatisfiable constraints. The computer-implemented method involves retrieving by a processor of a computer a minimal subset of constraints that remain together unsatisfiable. The computer-implemented method includes iterating over a list of n constraints from a first one of the list of constraints to an $n^{th}$ one of the list of constraints, and building a minimal explanation to a set of unsatisfiable constraints by determining by the processor which constraint to add to the set of unsatisfiable constraints. The building includes: accelerating by removing an increasing number of constraints until a removed plurality of further constraints makes a set of constraints satisfiable, performing a dichotomic search on the removed plurality of further constraints, identifying an average observed distance between successive constraints in the set of unsatisfiable constraints, removing a plurality of $2^k$ further constraints located in the list of constraints at the average observed distance from a most recently added constraint, and for the first $\log_2(n)$ added constraints, testing whether a current selected subset is unsatisfiable.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE DRAWINGS

Referring now to the drawings wherein like elements are numbered alike in the several FIGURES.

DETAILED DESCRIPTION OF THE EMBODIMENTS

Embodiments provide improvements of existing methods for computing explanations of over-constrained problems. Embodiments also provide improvements of existing methods for computing explanations of over-constrained problems. It is up to two times faster than the QuickXplain method for those over-constrained problems where most constraints belong to a conflict. Further embodiments also provide a technique for quickly terminating the computation of conflicts of small size.

Embodiments provide a method for providing a minimal explanation to a set of unsatisfiable constraints, the method involving retrieving a minimal subset of constraints that remain together unsatisfiable, the method comprising: providing a list of constraints, the list comprising n constraints; iterating over the list of n constraints from a first one of the list of constraints to an $n^{th}$ one of the list of constraints, building a minimal explanation to a set of unsatisfiable constraints by determining which constraint to add to the set of unsatisfiable constraints, the building step comprising the steps of: if a single removed constraint from the list of constraints keeps the set of constraints unsatisfiable, then starting with k=1, repeating the steps of removing a plurality of $2^k$ further constraints adjacent in the list of constraints to the removed constraint and incrementing k until the removed plurality of $2^k$ further constraints makes the set of constraints satisfiable; if a removed plurality of $2^k$ further constraints makes the set of constraints satisfiable, returning the most recently removed plurality of $2^k$ further constraints to the set of constraints and removing a subset of one half of the plurality of $2^k$ further constraints, then iteratively removing one half of the remaining constraints in the plurality of $2^k$ further constraints until the set of constraints is satisfiable, then returning the most recently removed constraints; identifying the average observed distance between successive constraints in the set of unsatisfiable constraints and in said step of removing a plurality of $2^k$ further constraints, removing a plurality of $2^k$ further constraints located in the list of constraints at the average observed distance from the most recently added constraint in the set of unsatisfiable constraints; and for the first $\log_2(n)$ constraints added to the set of unsatisfiable constraints, testing if the current selected subset is unsatisfiable.

Embodiments also provide a computer program for providing a minimal explanation to a set of unsatisfiable constraints, the providing involving retrieving a minimal subset of constraints that remain together unsatisfiable, the computer program product comprising: a computer readable storage medium having computer readable program code embodied therewith, the computer readable program code adapted to perform the method described above when the program is run on a computer.

Figure 3:
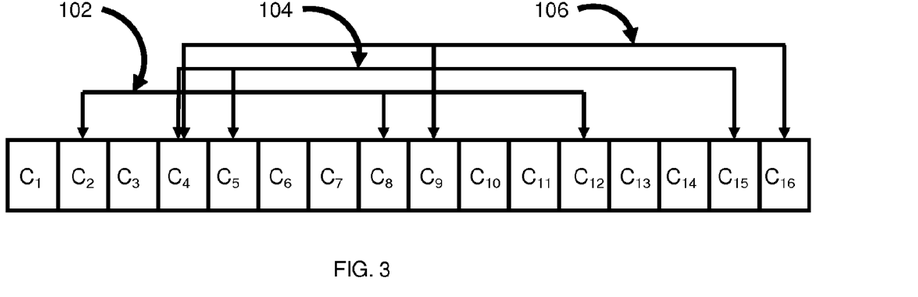
FIG. 3 shows the finite set U of FIG. 1 comprising ordered elements C1 through C16.

Turning to the figures, the finite set U in FIGS. 1 and 2 is ordered so that each element $C_i$ in U can be associated with a non-negative integer representing its position in U: U= $(C\_1, \ldots, C\_n)$. FIG. 3 shows the finite set U comprising ordered elements C1 through C16. Minimal explanation 102 of FIG. 1 comprises constraints $C_2$, $C_8$, and $C_{12}$. Other minimal explanations from FIG. 1 are constraints $C_4$, $C_5$ and $C_{14}$ (104) and constraints $C_4$, $C_9$ and $C_{16}$ (106).

An iterative method can be used to determine the minimal subset of constraints that is infeasible. A minimal subset X* can be constructed, starting from the empty set, by scanning the set U from left to right and adding to current subset X* a new element $x_{\_i}$ if and only if $X^* \cup \{C_{\_i+1}, \ldots, C_{\_n}\}$ does not satisfy the property. In this case it can indeed be shown that there exists a minimal subset necessarily containing $X^* \cup \{C_{\_i}\}$.

Three concepts will now be briefly described.

Usually, when the size of the minimal subset X* that the iterative method is looking for is large enough, the distance between two consecutive elements of subset X* is small, so it is better to start looking for next element $x_{\_i}$ close to the current position in finite set U. This is referred to later as an acceleration phase followed by a dichotomy.

Under some assumptions, the average distance (j−i) between two consecutive elements $(x_i, x_j)$ of the minimal subset X can be shown to be fairly independent from the position of the element in subset X. A consequence is that an iterative method, while iterating over the finite set U can estimate the approximate position of the next element x given the previously selected elements $(x_i, x_j, x_k, \ldots)$.

Each time a new element x is added to current subset X*, a test can be made to test whether $X^* \cup \{x_{\_i}\}$ satisfies the property. In this case, it means that $X^* \cup \{x_i\}$ is the minimal subset, and the method can stop. This test helps in stopping the search when the size of the minimal subset is small but can be expensive when the size of the minimal subset is getting close to n. This test is performed only for the first $\log_2(n)$ elements of current subset X*. This is referred to later as a lazy check for minimality.

Relying on the three concepts identified above, embodiments will be referred to as "ADEL", standing for Acceleration, Dichotomy, Evaluation and Lazy checks.

Referring to FIGS. 4 to 7, a first embodiment will now be described using an example with n=32 assuming there is a unique minimal subset X*=(x_5, x_8, x_13, x_19, x_22, x_25, x_29) that satisfies property P.

Figure 4:
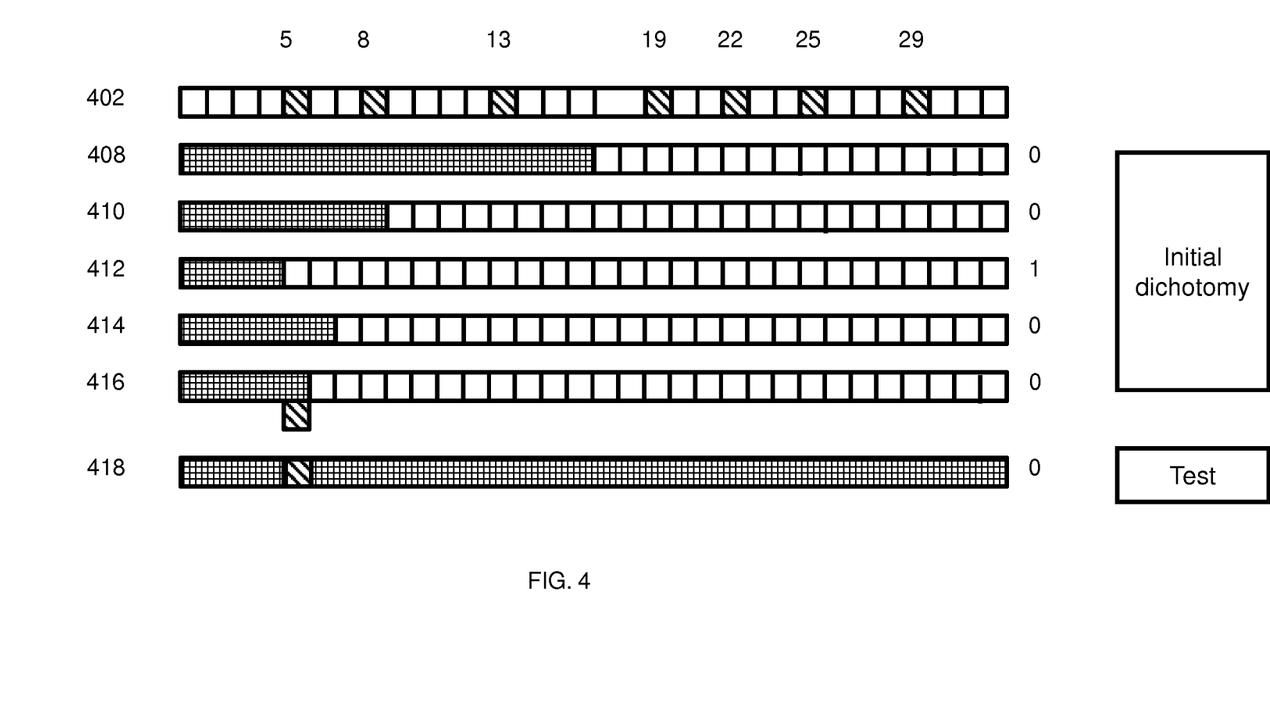
FIGS. 4 to 6 show three stages of an embodiment of a method for finding a minimal subset of elements that will provide an explanation of infeasibility.

Referring to FIG. 4, the elements of the set are shown in the top row 402 of the figure, with elements x_5, x_8, x_13, x_19, x_22, x_25 and x_29 shown in hatched form. The next five rows 408 to 416 show the steps followed during the dichotomy block described below. The last row 418 shows the subset which is tested during the test block described below.

Figure 7:
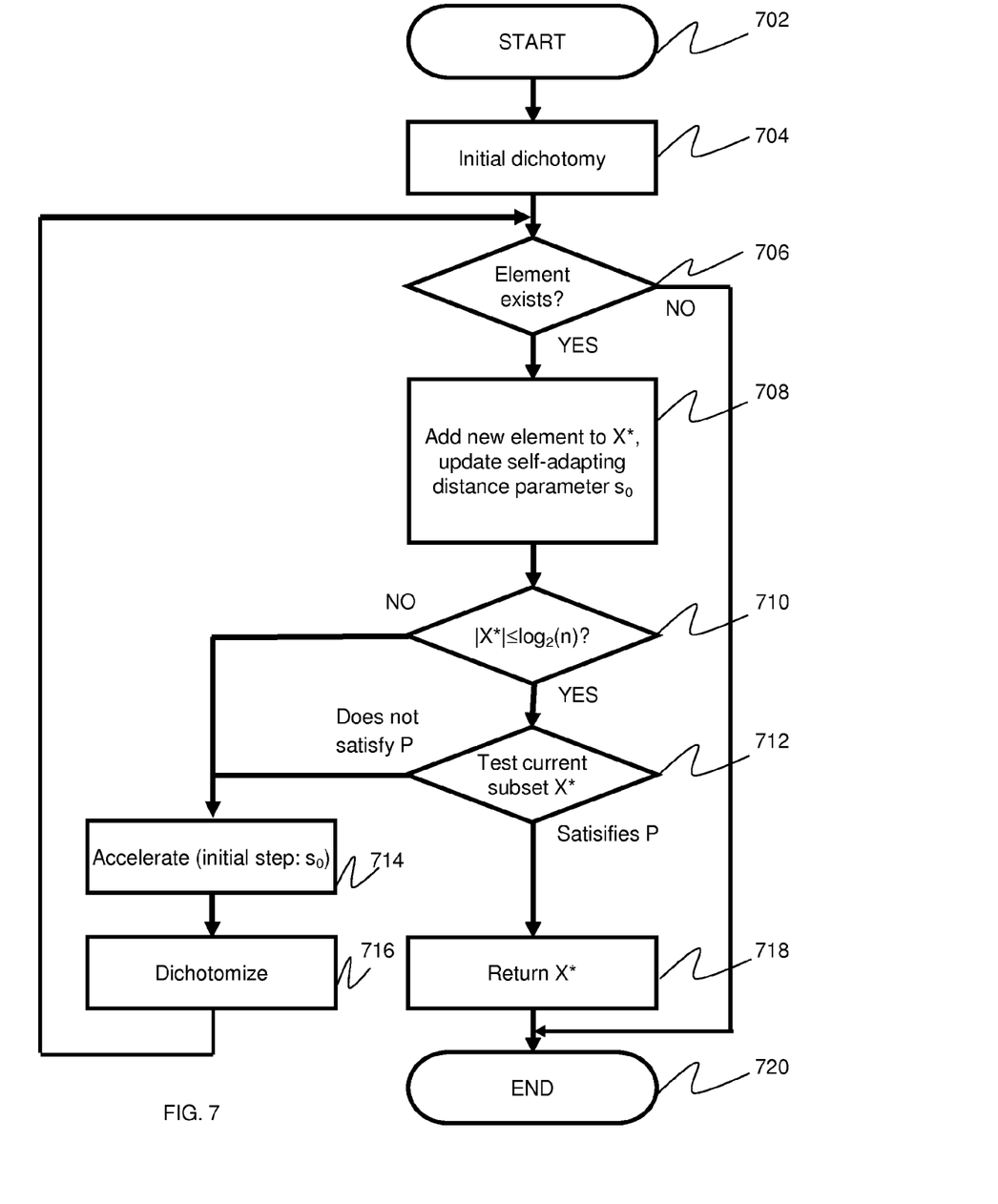
FIG. 7 shows a flow diagram of an embodiment of a method for finding a minimal subset of elements that will provide an explanation of infeasibility.

Referring to FIG. 7, the method starts at block 702. At block 704, an Initial Dichotomy is run to find the first element of the minimal subset (here x_5). Referring back to FIG. 4, in a first block of the dichotomy the first half of the elements (x_1, x_2, ..., x_16) shown in a small grid form in the second row 408 of FIG. 4 are removed and the remaining subset (x_17, x_18, ..., x_32) is tested. As this subset does not satisfy the property it means that the first element of subset X* necessarily belongs to the first half of the elements (x_1, x_2, ..., x_16). The results of property checks are displayed on the right side of the figure, the result being 0 for the first test. In a second block of the dichotomy, a smaller subset (x_1, x_2, ..., x_8) of the elements shown in a small grid form in the third row 410 of FIG. 4 are removed and the remaining subset (x_9, x_10, ..., x_32) is tested. As this subset does not satisfy the property it means that the first element of subset X* necessarily belongs to the first quarter of the elements (x_1, x_2, ..., x_8). In a third block of the dichotomy, a smaller subset (x_1, x_2, ..., x_4) of the elements shown in a small grid form in the fourth row 412 of FIG. 4 are removed and the remaining subset (x_5, x_5, ..., x_32) is tested. As this subset does satisfy the property it means that the first element of subset X* necessarily belongs to the subset of elements (x_5, x_6, ..., x_8). In a fourth block of the dichotomy, a subset (x_1, x_2, ..., x_6) of the elements shown in a small grid form in the fifth row 414 of FIG. 4 are removed and the remaining subset (x_7, x_8, ..., x_32) is tested. As this subset does not satisfy the property it means that the first element of subset X* necessarily belongs to the subset of the elements (x_5, x_6). In a fifth block of the dichotomy, a subset (x_1, x_2, ..., x_5) of the elements shown in a small grid form in the sixth row 416 of FIG. 4 are removed and the remaining subset (x_6, x_8, ..., x_32) is tested. As this subset does not satisfy the property it means that the first element of subset X* necessarily belongs to the subset of the elements (x_5), that is, that the first element of subset X* is (x_5). This fifth element is shown in hatched form in the lower half of row 416. It is added to the subset X*.

At block 706 of FIG. 7 a determination is made as to whether a first element exists. As the current empty subset does not satisfy P, another element exists and the search continues with a new acceleration/dichotomize block. If the current subset did satisfy P, then the entire set U is feasible and does not satisfy the property. Each time a new element is added to the current subset X*, the new X* is tested against the property. And if X* satisfies the property (constraint subset is infeasible) the method stops at block 720 as (1) the subset is infeasible and (2) it is (by construction) minimal. The acceleration will start with an updated self-adapting distance parameter $s_0$. At block 708, the distance parameter $s_0$ is set to be the index i of the first element x_1. This is equal to 5.

Referring to FIG. 7, at block 710 a test is made to determine whether the size of the current subset X* is smaller than the log of the size of the entire set X*, that is whether $|X^*| \leq \log_2(n)$. The current subset is shown at row 418 of FIG. 4 in white, with the remaining elements not in the subset shown in a small grid form. In this case, the size of the current subset X* is 1. The size of the entire subset X* is 32 and so $\log_2(n)$ is 5. Since 1 is less than or equal to 5, then processing moves to block 712. As only the first $\log_2(n)$ elements are checked this is the Lazy check block referred to earlier.

At block 712 a Test is made to determine whether the current subset X* satisfies the property P. If the current subset X* satisfies the property P, then at block 718, the subset X* is returned and the method ends at block 720. If the current subset X* does not satisfy the property P, then new elements need to be searched for and processing moves to block 714.

Figure 5:
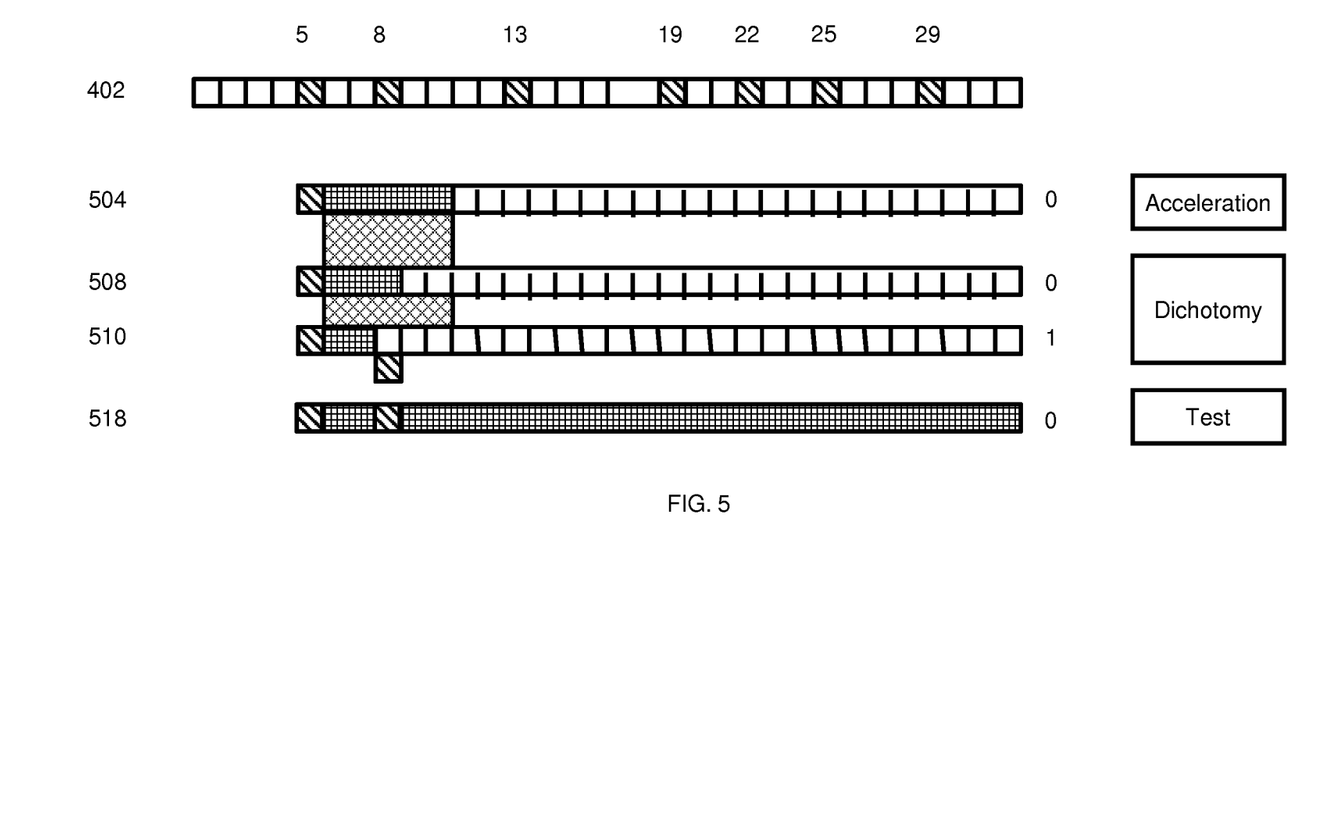

Referring to FIG. 5, each iteration of the method starts with an acceleration phase 714 that tries to remove elements that are close to the current position. In this block, because the first element is at position 5, an embodiment assumes that the average distance between consecutive elements in X* will be around 5. This is the block referred to earlier as Evaluate. A first block is to remove the first 5 elements immediately after x_5, then the next 10 elements, then the next 20 elements and the like until a subset is reached that does not satisfy the property. This means that a relatively small subset is used to look for the next element.

In the case of the example above, in the first block of the Acceleration 714, a subset (x_6, x_7 ... x_10) of the elements shown in a small grid form in the second row 504 of FIG. 5 are removed and the remaining subset {x5}∪(x_11, x_12, ..., x_32) is tested. As this subset does not satisfy the property it means that the second element of subset X* necessarily belongs to the elements (x_6, x_7, ..., x_10). Processing now moves to block 716 in FIG. 7.

At block 716 of FIG. 7, a Dichotomy is run to find the next element in the subset (x_6, x_7, ..., x_10). In a first block of the dichotomy, a subset (x_6, x_7, x_8) of the elements shown in a small grid form in the third row 508 of FIG. 5 are removed and the remaining subset {x5}∪(x_9, x_10, ..., x_32) is tested. As this subset does not satisfy the property it means that the second element of subset X* necessarily belongs to the elements (x_6, x_7, x_8). In a second block of the dichotomy, a smaller subset (x_6, x_7) of the elements shown in a small grid form in the fourth row 510 of FIG. 5 are removed and the remaining subset {x5}∪(x_8, x_9, ..., x_32) is tested. As this subset does satisfy the property it means that the second element of subset X* necessarily belongs to the subset of elements (x_8). This eighth element is shown in hatched form in the lower half of row 510. It is added to the subset X*.

The current subset at this point is (x_5, x_8). At block 706 of FIG. 7, a determination is made as to whether another element exists. As the current subset does not satisfy P, another element exists and the search continues with a new acceleration/dichotomize block. Each time a new element is added to the current subset X*, the new X* is tested against the property. And if X* satisfies the property (constraint subset is infeasible) the method stops at block 720 as (1) the subset is infeasible and (2) it is (by construction) minimal. The acceleration will start with an updated self-adapting distance parameter $s_0$. At block 708, the distance parameter $s_0$ is updated from an average distance between elements of 5 to the average observed distance between consecutive elements of the two previous dichotomize blocks, that is the average of 5 and (8-5). This is equal to 4.

Referring to FIG. 7, block 710 as described above is repeated. The current subset (x_5, x_8) is shown at row 518 of FIG. 5 hatched, with the remaining elements not in the subset shown in a small grid. In this case, the size of the current subset X* is 2. The size of the entire set X is 32 and so $\log_2(n)$ is 5. Since 2 is less than or equal to 5, then processing moves to block 712. At block 712, a Test is made as described above to determine whether the current subset X* satisfies the property P. The current subset X* does not satisfy the property P, so new elements need to be searched for and processing moves to block 714.

Figure 6:
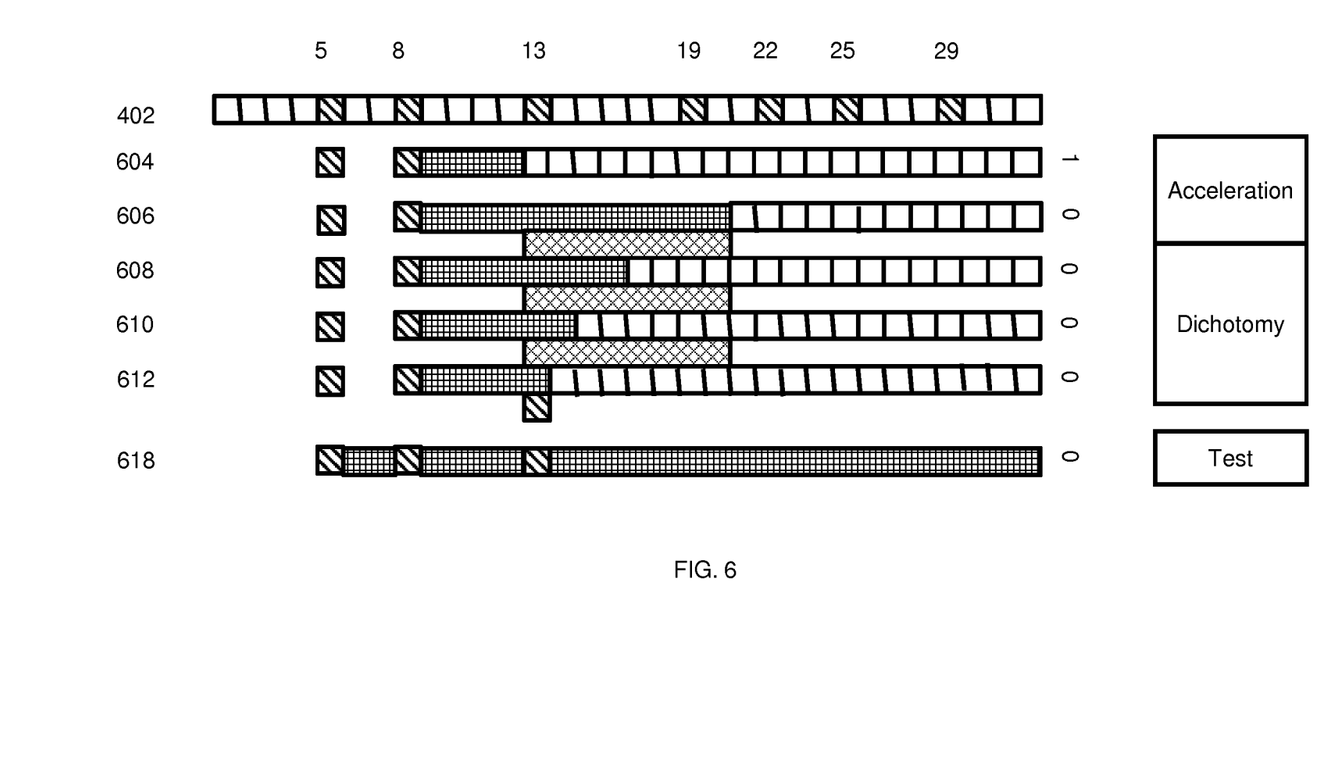

Referring to FIG. 6, in a first block of an Acceleration, the first 4 elements immediately after x_8 shown in a small grid form in the second row 604 of FIG. 6 are removed. As the resulting subset (x_5, x_8)∪(x_13, x_14, . . . , x_32) satisfies the property, then, in a second block of an Acceleration, the next 8 elements immediately after x_8 shown in a small grid form in the third row 606 of FIG. 6 are removed. Here (x_5, x_8) U (x_21, x_22, . . . x_32) does not satisfy the property so it means that the second element of subset X* necessarily belongs to the elements (x_13, x_14, . . . , x_20). As the subset X8 does not satisfy the property, processing now moves to block 716 in FIG. 7.

At block 716 of FIG. 7, a dichotomy is run to find the next element in the subset (x_13, x_14, . . . , x_20). In a first block of the dichotomy, a subset (x_9, x_10, . . . , x_16) of the elements shown in a small grid form in the fourth row 608 of FIG. 6 are removed and the remaining subset (x_17, x_18, . . . , x_32) is tested. As this subset does not satisfy the property it means that the third element of subset X* necessarily belongs to the elements (x_9, x_10, . . . , x_16). In a second block of the dichotomy, a smaller subset (x_9, x10, . . . , x_14) of the elements shown in a small grid form in the fifth row 610 of FIG. 6 are removed and the remaining subset (x_15, x_16, . . . , x_32) is tested. As this subset does satisfy the property it means that the second element of subset X* necessarily belongs to the subset of elements (x_13, x_14). In a third block of the dichotomy, a smaller subset (x_9, x10, . . . , x_13) of the elements shown in a small grid form in the sixth row 612 of FIG. 6 are removed and the remaining subset (x_14, x_15, . . . , x_32) is tested. As this subset does satisfy the property it means that the second element of subset X* necessarily belongs to the subset of elements (x_13). This eighth element is shown in hatched form in the lower half of row 612. It is added to the subset X*.

The current subset at this point is (x_5, x_8, x_13). At block 706 of FIG. 7, a determination is made as to whether another element exists. As the current subset does not satisfy P the search continues with a new acceleration/dichotomize block. The acceleration will start with an updated self-adapting distance parameter $s_0$. At block 708, the distance parameter $s_0$ is updated from an average distance between elements of 4 to the average distance between consecutive elements of the three previous dichotomize blocks, that is the average of 5, (8-5) and (13-8). This is equal to 4.

The search continues with blocks 706 to 712, then blocks 714 and 716 being executed and finding elements x_19 and x_22. After element x_22 has been found, at block 710, as the size of the current subset (5) is equal to log(n), block 710 results in processing proceeding to block 714 instead of block 712. Similarly, after elements x_25 and x_29 have been found, at block 710, as the size of the current subset is greater than $\log_2(n)$, block 710 results in processing proceeding to block 714 instead of block 712.

Once element x_29 has been found, then the test at block 706, the determination as to whether another element exists finds that another element does not exist because the current subset does satisfy P. The method then ends at block 720. The minimal subset X* that satisfies property P has now been found as (x_5, x_8, x_13, x_19, x_22, x_25, x_29).

Figure 8:
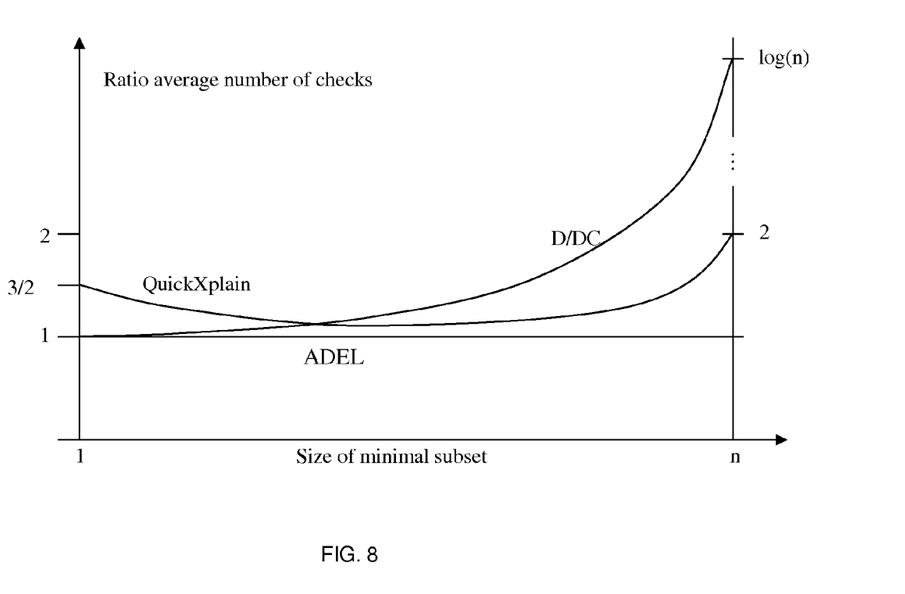
FIG. 8 is a graph of the relative performance of DC and QuickXplain methods when compared to an ADEL method of embodiments in terms of the number of property checks depending on the size of the minimal subset.

Embodiments outperform both existing iterative and recursive methods for finding a minimal subset satisfying an upward-closed property. FIG. 8 illustrates the relative performance of D (Dichotomize), DC (referred to above in respect of Hemery et al.) and QuickXplain (referred to above in respect of Junker) compared to ADEL in terms of number of property checks depending on the size of the minimal subset.

For an extreme case of a minimal subset of size 1, shown at the left hand side of FIG. 8, both ADEL and DC have the same average complexity on the order of $\log_2(n)$ checks and for both ADEL and DC, this complexity does not depend on the position of the element of the minimal subset in U so this average complexity is both a best-case and a worst-case complexity. In a similar situation, the complexity of QuickXplain varies between $\log_2(n)$ in the best case and $2.\log_2(n)$ in the worst case, with an average complexity that can be shown to be $3/2.\log_2(n)$. In FIG. 8, this is shown for QuickXplain as a hatched bar between 1 and 2 at the left hand axis and the point 3/2 shown for the average complexity. So for small minimal subsets of size 1, the complexity of ADEL is optimal on the order of $\log_2(n)$ as is D/DC and it outperforms QuickXplain by a factor 3/2 on average.

In another extreme case of a minimal subset of size n, the optimal complexity is on the order of n because any method must at least test that removing any single element in U leads to a subset that does not satisfy the property P. The complexity of ADEL in this case is precisely on the order of n. The relative complexity is this complexity divided by the size of the minimal subset, in this case n divided by n. This is shown at the right hand side of FIG. 8 as 1 for ADEL. QuickXplain has a complexity of 2.n and a relative complexity of 2.n divided by n, that is 2, also shown on the right hand side of FIG. 8. DC has a complexity of $n.\log_2(n)$ and a relative complexity of $n.\log_2(n)$ divided by n, that is log 2(n). This is shown on the right hand side of FIG. 8.

Note that for algorithmic complexity, the comparison described above is a more fine-grain measure than the traditional "big O" comparison because the number of property checks are counted which is a homogeneous measure for all the approaches. A comparison is used of "on the order of": $f(n) \sim g(n)$ meaning $\lim_{n \to +\infty} f(n)/g(n)=1$. This allows constant factors to be taken into account.

The complexity study at both extreme cases shows that ADEL has optimal complexity and outperforms both DC and QuickXplain. An experimental study on randomly generated problems suggests that ADEL also achieves better results in between those extremal cases.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for providing a minimal explanation to a set of unsatisfiable constraints, the computer-implemented method involving retrieving by a processor of a computer, a minimal subset of constraints that remain together unsatisfiable, the computer-implemented method comprising:

providing a list of constraints, the list comprising n constraints; and iterating over the list of constraints from a first one of the list of constraints to an $n^{th}$ one of the list of constraints, building a minimal explanation to a set of unsatisfiable constraints by determining by the processor which constraint to add to the set of unsatisfiable constraints, the building comprising:

identifying an average observed distance between successive constraints in the set of unsatisfiable constraints based on differences in positions of the constraints;

if a single removed constraint from the list of constraints keeps the set of constraints unsatisfiable, then starting with k=1, repeating the steps of (a) removing a plurality of $2^k$ further constraints adjacent in the list of constraints to the single removed constraint and (b) incrementing k until the removed plurality of $2^k$ further constraints makes the set of unsatisfiable constraints satisfiable; and if the removed plurality of $2^k$ further constraints makes the set of unsatisfiable constraints satisfiable, returning the most recently removed plurality of $2^k$ further constraints to the set of constraints and removing a subset of one half of the plurality of $2^k$ further constraints, then iteratively removing one half of the remaining constraints in the plurality of $2^k$ further constraints until the set of constraints is satisfiable, then returning the most recently removed constraints.

2. The computer-implemented method of claim 1, wherein the positions are index values.

3. The computer-implemented method of claim 2, wherein the removing a plurality of $2^k$ further constraints further comprises removing a plurality of $2^k$ further constraints located in the list of constraints at the average observed distance from a most recently added constraint in the set of unsatisfiable constraints.

4. The computer-implemented method of claim 3, wherein the building further comprises testing whether a current selected subset is unsatisfiable for the first $\log_2(n)$ constraints added to the set of unsatisfiable constraints.

5. The computer-implemented method of claim 1, wherein the list of constraints is arranged in a random order.

* * * * *